March 29, 1927. 1,622,810
C. A. SCHARFFE
LIQUID DISPENSING APPARATUS
Filed Feb. 19, 1925
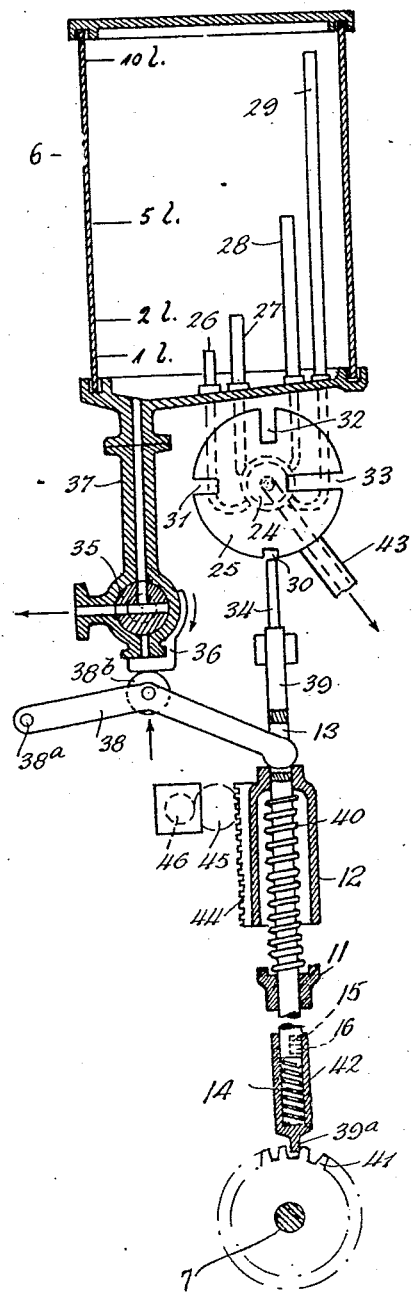
INVENTOR
CARL A. SCHARFFE
BY Richards & Geier
ATTORNEYS Patented Mar. 29, 1927.

1,622,810

UNITED STATES PATENT OFFICE.

CARL ADOLPH SCHARFFE, OF HAMBURG, GERMANY.

LIQUID-DISPENSING APPARATUS.

Application filed February 19, 1925, Serial No. 10,324, and in Germany February 6, 1924.

This invention relates to liquid dispensing devices, and aims particularly to provide an improved measuring and dispensing apparatus, from which the liquid cannot be removed without actuating a register or recording device.

The single figure of the drawing is a sectional view of a device embodying my invention.

Referring to the drawing, the measuring chamber 6 is formed of the usual transparent material, and is graduated in liters, as shown, or in other units. A plurality of overflow pipes 26, 27, 28 and 29 are arranged to be selectively connected to drain pipe 43 by means of a rotary valve 24, to which is fixed a disc 25. Disc 25 has slots 30, 31, 32 and 33 of various depths proportioned to the volumes defined by the respective overflow pipes, and adapted to receive a pin 34, carried by a rod 39, which is vertically movable in a fixed bracket member 11. A cam 36 is secured to a rotary valve 35 in the combined intake and delivery pipe 37. A lever 38, pivoted at 38$^a$, carries a roller 38$^b$ which engages the cam 36. The free end of the lever 38 engages in a slot 13 in the rod 39, which rod is urged upwardly by a spring 40, which rests upon the fixed bracket member 11, and at its upper end engages a housing 12, fixed to rod 39. Upon the lower end of rod 39, a sleeve 42 is slidably mounted, its movement in both directions being limited by the movement of pin 15 in slot 16. Sleeve 42 is urged downwardly by a spring 14, and terminates in a tooth 39$^a$ which is adapted to engage a gear 41 fixed to the shaft 7 of a feed-pump (not shown), to thereby arrest the rotation of the shaft. The pump has its outlet connected to pipe 37 to permit filling of the measuring chamber 6.

In order to supply 5 litres of fuel for instance, the disc 25 is turned to such an extent, that the overflow-pipe 28 comes into communication with the drain-pipe 43, whereas the other overflow-pipes are closed. If the valve 35 is turned to intake position, cam 36 is also rotated, allowing the rod 39 to be moved upwardly by spring 40. Pin 34 then enters the slot 32, while the tooth 39$^a$ releases the gear 41 and thus allows the feed-pump to operate, whereupon the measuring chamber 6 is filled to the 5-litre level. When the valve 35 is turned in order to deliver the fuel, the pin 34 is disengaged from the slot 32 by means of the cam 36 and the rod 39 lowered, whereupon the tooth 39$^a$ again engages the gear 41 and arrests the pump-shaft. The housing 12 carries a tooth-rack 44 which is adapted to actuate the intermeshing gears 45 and 46 in such a manner, that the gears rotate, when the rod 39 is lowered, the rotation corresponding with the amount of downward motion of the rod 39, and thus indicating the quantity of fluid supplied. Any surplus above the quantity to be dispensed runs off at once, the quantity proper being immediately correctly indicated, if it is delivered by means of the valve 35, as the depth of the slots 30, 31, 32 and 33 are such, that each is a multiple of the depth of slot 30, which corresponds to a volume of 1 litre. After delivery, a new adjustment of the valve 24 can take place, whereupon, by turning the valve 35, the connection between the pump and the pipe 37 is opened, and thus a further quantity of fluid can be pumped into the measuring chamber.

Having thus described my invention what I claim as new and desire to secure by Letters Patent is:—

1. In a liquid dispensing device, a measuring chamber, means for limiting the height of liquid in said chamber to any of several values, a delivery pipe leading from said chamber, a valve in said delivery pipe, a registering device, actuating means for said registering device, means associated with said limiting means for defining the movement of said actuating means, and means associated with said valve for operating said actuating means.

2. In a liquid dispensing device, a measuring chamber, a pump for delivering liquid to said chamber, means for limiting the height of liquid in said chamber to any of several values, a delivery pipe leading from said chamber, a valve in said delivery pipe, a registering device, actuating means for said registering device, means associated with said limiting means for defining the movement of said actuating means, and means associated with said valve for operating said actuating means, and for preventing the operation of said pump.

3. In a liquid dispensing device, a measuring chamber, means for limiting the height of liquid in said chamber to any of a plurality of values, a delivery pipe leading from said chamber, a valve in said delivery pipe, a registering device, actuating means for said registering device, means associated with said limiting means for defining the movement of said actuating means, and a cam secured to said valve for operating said actuating means.

4. In a liquid dispensing device, a measuring chamber, selective means for limiting the height of liquid in said chamber to any of a plurality of values, a combined intake and delivery pipe leading from said chamber, a rotary valve in said pipe, a registering device, actuating means for said registering device, a rotary disk associated with said limiting means and having a plurality of radial slots for defining the movement of said actuating means, a cam secured to said valve, and means actuated by said cam for operating said actuating means.

In testimony whereof I have affixed my signature.

CARL ADOLPH SCHARFFE.